Nov. 8, 1966   G. WINTRISS   3,283,979
AUTOLEVEL CONTROL
Filed May 22, 1964
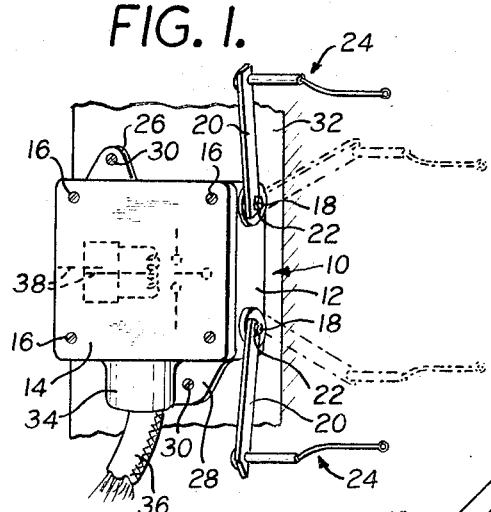
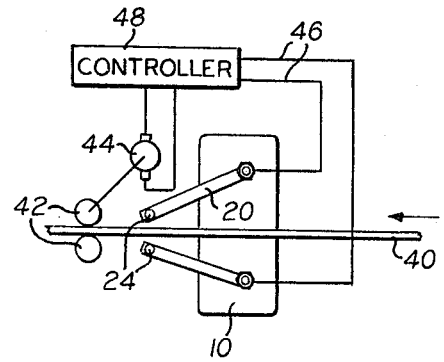
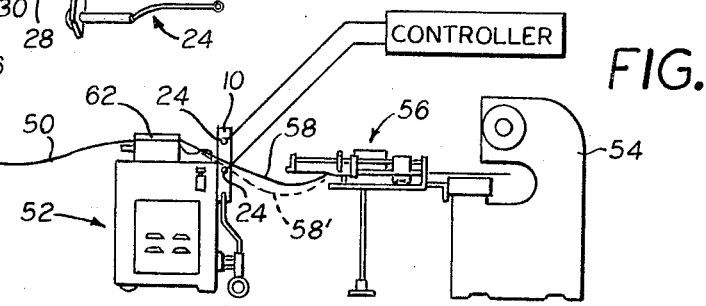
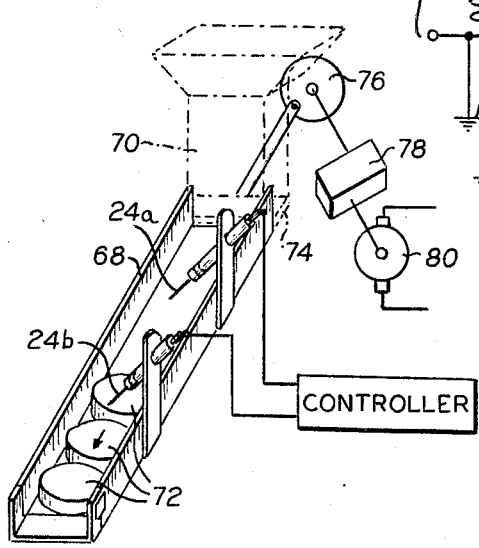
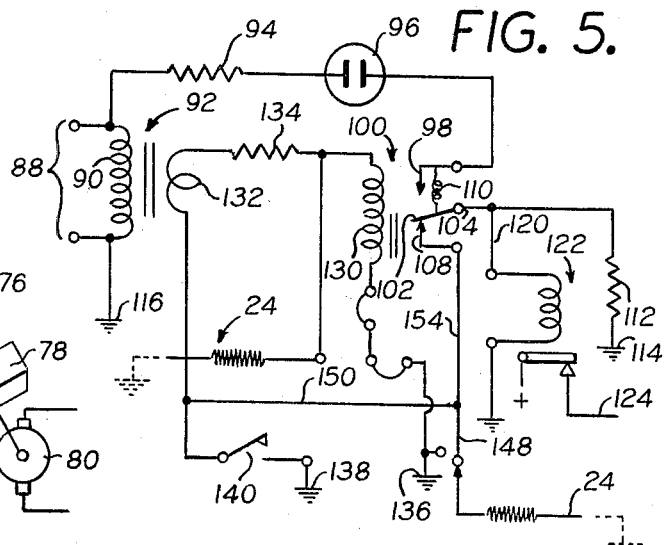
INVENTOR
George Wintriss
BY Emery, Whittemore
Sandoe & Graham
ATTORNEYS.

United States Patent Office 3,283,979
Patented Nov. 8, 1966

3,283,979
AUTOLEVEL CONTROL
George Wintriss, Carversville, Pa.
Filed May 22, 1964, Ser. No. 369,383
11 Claims. (Cl. 226—43)

This invention relates to apparatus for the control of automatic machines. More particularly the invention provides position-responsive circuits that set limits on opposite sides of a neutral position for controlling operation of a machine in the event that work moves as far as these limits in either direction.

It is an object of the invention to provide control apparatus with spaced probes, referred to herein as "upper and lower probes" for detecting movement of stock or other work pieces, herein referred to as the "work," beyond a predetermined range. The probes are preferably adjustable to change the width of the range within which the work can move without signalling a departure from normal operation of the machine.

In the preferred construction, the probes are part of the electric circuit and touching of the probes by the work grounds the circuit, preferably to ground potential of the frame of the machine; the operating voltage of the probe circuit being low so that an operator does not experience an electric shock when he touches one of the probes. For situations where it is not desirable to have the conductors of the probe circuits exposed, different kinds of probes can be used which have contacts within the probe as disclosed in the application of Lydia Torres, Serial No. 157,371, now Patent No. 3,213,225.

Another object is to provide a control with upper and lower level probes connected in a control circuit for starting or speeding up, or stopping or slowing down, the operation of automatic feed means in response to contact of the work with the different probes; as for example, the increase or decrease in the amount of slack in a loop.

Other objects, features and advantages of the invention will appear or be pointed out as the description proceeds.

In the drawing, forming a part hereof, in which like reference characters indicate corresponding parts in all the views:

FIGURE 1 is an isometric view showing control apparatus made in accordance with this invention;

FIGURE 2 is a diagrammatic view showing one way in which the apparatus of FIGURE 1 can be used for detecting a buckle in a strip;

FIGURE 3 is a diagrammatic view showing another way in which the invention is used for controlling the feed of a work strip in accordance with the amount of slack in a loop;

FIGURE 4 is a diagrammatic view showing a modified form of the invention for the feeding of work along a support; and FIGURE 5 is a wiring diagram for the apparatus shown in some of the other views, and particularly for the apparatus shown in FIGURE 3.

FIGURE 1 shows a housing 10 which is a boxlike structure having sides 12 and a front cover 14 attached to the housing 10 be detachable fastening means such as screws 16. FIGURE 1 shows one of the sides 12 and this side is of substantially greater height than width. There are studs 18 extending from the side 12 near opposite ends of the side in a vertical direction so as to obtain wide spacing of the studs 18.

The studs 18 are preferably substantially parallel to one another and there is an arm 20 secured to each of the studs 18 by fastening means such a nut 22. The arms 20 are angularly movable about the axes of the studs 18 and the arms can be clamped in any adjusted angular position by tightening the nuts 22.

At the end of each arm 20, remote from its connection with the stud 18, there is a probe 24 connected at one end to the arm 20 and extending generally normal to the direction of extent of the arm so that the probes 24 on the respective arms 20 are substantially parallel to one another. By changing the angular relation of the arms 20 the probes 24 can be adjusted toward and from one another over a wide range. FIGURE 1 shows the probes 24 widely spaced from one another, whereas FIGURE 2 shows the arms 20 adjusted so as to bring the probes 24 close together.

There are tabs 26 and 28 on the housing 10 and preferably of integral construction with the housing 10. These tabs 26 and 28 have holes 30 therein for receiving bolts or other fastenings to connect the housing 10 to a fixed support 32. In the lower wall of the housing 10 there is an outlet 34 through which an electric cable 36 extends from within the housing 10.

There is considerable electrical control mechanism and there are various circuits for this mechanism within the housing 10 the electrical apparatus being indicated generally in FIGURE 1 by the reference character 38. Access to the electrical apparatus 38, within the housing 10, can be obtained by removing the screws 16 and taking the cover 14 off the housing. This provides access to the circuits without disturbing the fixed mounting of the housing on the support 32 and without disturbing the adjustment of the probes 24 with respect to one another.

FIGURE 2 shows the housing 10 with the arms 20 adjusted so as to leave the probes 24 with only a narrow space between them. A strip of work material 40 is fed through the space between the probes 24 by feed rolls 42 driven by a motor 44. The probes 24 are connected by conductors 46 to a controller 48 which is a supplement to the control apparatus in the housing 10. The apparatus in the housing 10 operating together with the controller 48 shuts off the power to the motor 44 and stops further feed of the strip 40 in the event that a buckle in the strip causes it to touch either or both of the probes 24 as it travels through the space between the probes. Thus the invention can be used to prevent feeding of a buckled strip into processing machines. The wiring diagram for controlling the motor 44 in FIGURE 2 will be explained in connection with FIGURE 5.

FIGURE 3 shows another installation of the invention between different processing units that operate on a work strip 50.

There is a power straightener 52 through which the strip passes on its way to a press 54; the strip is fed to the press 50 by feed mechanism 56. A loop of the strip 50 is maintained between the straightener 52 and the feeder 56. The normal loop is indicated by the reference character 58 and is shown in full lines. An excessive loop resulting from the power straightener supplying strip faster than the feeder 56 feeds it to the press 54 is shown in dotted lines in FIGURE 3 and indicated by the reference character 58'.

The straightener 56 has its feed mechanism located in a housing 62 and the control apparatus of this invention is positioned between the feeder 62 of the straightener and the feeder 56 of the press 54. The housing 10 is shown diagrammatically with the upper and lower probes 24. The stock strip 50 passes between the upper and lower probes 24. If the feeder 62 advances the stock strip 50 faster than it is used by the feeder 56, then the loop accumulates until it touches the lower probe 24, as is the case with the loop 58′, and this causes the power straightener 52 to stop.

As the feeder 56 continues to take stock strip 50 for the press 54, the slack in the loop 58′ is used and the loop becomes shorter until it becomes so short that it touches the upper probe 24 and this resets the control apparatus of this invention and causes the motor of the power straightener 52 to resume operation and the feeder 62 to advance more stock strip 50 to increase the slack in the loop 58′.

The control circuits for the invention will be explained in connection with FIGURE 5. For the present it is sufficient to understand that whenever the loop of stock strip 50 increases in slack until it touches the lower probe 54, further feed of stock strip to the loop is stopped, or slowed down, and whenever the loop shortens until it touches the upper probe 54, the feed of stock strip to the loop is resumed or the speed of the feed increased.

FIGURE 4 shows another modification of the invention. A chute 68 leads from a supply hopper 70 to a machine which operates on work pieces 72. These work pieces are discharged from the hopper 70 into the chute by a plunger 74 operated by an eccentric 76 or other cam means driven through a speed reducer 78 from a motor 80. There are probes 24a and 24b located along the chute 68 in position to be touched by the work pieces 72. As long as there is no work piece 72 in contact with the probe 24b, the control apparatus causes the motor 80 to operate the feed mechanism and to supply successive work pieces to the chute 68 until the number of work pieces 72 in the chute builds up and extends back in the chute as far as the probe 24a. When any work piece remains in contact with the probe 24a, this causes the control apparatus to stop the motor 80 and there is no further feed of work to the chute 68 until enough work has been removed from the discharge end of the chute to leave the probe 24b out of contact with any work piece. This starts the motor 80 and the cycle is repeated.

FIGURE 5 shows a representative wiring diagram for the invention. This diagram is especially suitable for use with the control situation presented in FIGURE 3. Some modifications are made in the wiring diagram to suit the different conditions under which the invention is required to operate.

In FIGURE 5 the power supply for the invention is obtained from a power line 88 which connects with opposite ends of a primary coil 90 of a transformer 92. The power 88 is also connected through a resistor 94 and signal light 96 to an upper contact 98 of a relay 100. The relay has an armature 102 movable about a pivot 104 selectively into contact with the upper contact 98 or a lower contact 108. The armature 104 has a spring 110 which gives the relay a bias into position which closes the armature 102 against the upper contact 98 so that the circuit from the power line 88 is completed through another resistor 112 having a ground connection 114 to the frame of the machine. The other side of the power line 88 is connected to the frame by the ground connection 116.

There is a shunt circuit 120 which contains a relay 122 that is in the power supply line 124 to the motor of feeder 62. Whenever the relay 122 is energized, it breaks the circuit of the power supply line 124 and shuts off power to the motor so that the feeder 62 stops. This occurs whenever the armature 102 of the relay 100 is held against the upper contact 98 by the spring 110.

The relay 100 has an operating coil 130 which, when energized, moves the armature 102 into contact with the lower contact 108. Power for energizing the coil 130 is obtained from a secondary coil 132 of the transformer 92. One side of this secondary coil 132 is connected through a resistor 134 to the upper end of the coil 130. The lower end of the coil 130 is grounded on the frame of the machine at 136. The other side of the secondary coil 132 is grounded on the frame at 138 so as to complete the circuit of the transformer coil 132. There is, however, a manual control switch 140 by which the ground connection 138 can be broken for reasons which will be explained.

The lower probe 24 of this invention is connected to the wiring diagram of FIGURE 5 by a conductor 144 which connects with the circuit between the resistor 134 and the relay coil 130. Whenever the lower probe 24 makes a ground connection, by touching a piece of work in the case of an exposed probe, or by touching an internal contact in the case of a probe having internal contacts, the power supply from the transformer coil 132 to the relay coil 130 is short circuited and the relay 130 becomes de-energized. This permits the spring 110 to move the armature 102 away from the contact 108 and into contact with the upper contact 98.

The relay 130 can be energized by closing the manual switch 140 or it can be energized by grounding the upper probe 24 which is connected by conductors 148 and 150 to the same side of the transformer coil 132 as is the switch 140.

After the relay coil 130 has been energized, either by momentary closing of the manual switch 140 or by grounding of the upper probe 24, as already described, the armature 102 is closed against the lower contact 108 and a holding circuit for the relay coil 130 is established through the resistor 112, armature 102, lower contact 108, conductor 154, and conductor 150 to the transformer coil 132. This low voltage circuit of the secondary coil 132 of the transformer is not sufficient to energize the relay 122 to open the power supply circuit of the motor for the feeder 62. It is only when the relay coil 130 is de-energized and the spring 110 pulls the armature 102 up against the upper contact 98 that the high voltage of the power line 88 is impressed upon the relay 122 to energize it and open the circuit 124 for the motor of the feeder 62.

When the wiring diagram of FIGURE 5 is to be used for an installation such as that shown in FIGURE 2, and it is desired that the feeder motor 44 should stop in the event that there is a buckle in either direction which causes the work strip 40 to touch either of the probes 24, then the wiring diagram of FIGURE 5 is modified by connecting both of the probes 24 with the circuit 144 so as to short circuit the relay coil 130 if either probe is grounded. The apparatus, in such case, is reset by the manual reset switch 140. The power supply line 124 is the supply line for the motor 44 when using the circuit for the apparatus shown in FIGURE 2.

When using the wiring diagram in FIGURE 5 for the apparatus shown in FIGURE 4, the probe 24a is connected to the conductor 144 in place of the probe 24 shown in FIGURE 5 and the probe 24b is connected with the conductor 148 in place of the upper probe 24 shown in FIGURE 5. The power supply circuit 124 is used to supply power to the motor 80 of FIGURE 4 when using the invention for that installation.

The preferred embodiments of the invention have been illustrated and described, but changes and modifications can be made and some features can be used in different combinations without departing from the invention as defined in the claims.

What is claimed is:

1. Control apparatus for automatic machines including a housing containing control means, two studs extending from the outside of the housing, an arm on each of the studs and adjustable angularly about the axes of the studs, probes extending outwardly from the arms at locations spaced from the studs and on opposite sides of the arms from the studs and in directions generally parallel to the axes of the studs whereby angular adjustment of the arms changes the spacing of the probes from one another, an electric circuit in the housing, and conductors leading from different parts of the electric circuit to the respective probes.

2. The control apparatus described in claim 1 characterized by at least one of the probes being electrically insulated from its arm and having a conductor leading down the arm and into the housing, means for connecting the housing with a fixed support, a cover over a portion of the housing at a location different from that from which the studs extend, and fastening means holding the cover on the housing, the fastening means being detachable for removal of the cover and access to the electric circuit in the housing without disturbing the adjustment of the arms and probes.

3. The control apparatus described in claim 1 characterized by strip processing units from one of which a strip is fed to the other with a loop of strip between said units, the probes being located between said units along the loop with one probe above the strip and the other below the strip, power means for feeding the strip, the electric circuit in the housing being operably connected with the power means for feeding the strip.

4. The control apparatus described in claim 3 characterized by the power means for feeding the strip including control means for stopping and starting the feeding of the strip from one unit to the other, the control means including a circuit responsive to contact of the strip with the upper probe for starting the feeding of the strip and a circuit responsive to contact of the strip with the lower probe for stopping the feeding of the strip.

5. Apparatus for controlling of the feeding of a strip including a housing having arms extending therefrom, electric contact probes at the outer ends of the arms remote from the housing, bearings by which the arms are supported at their inner ends and on which the arms are angularly adjustable with respect to one another to change the spacing of the probes from one another, means for feeding a strip along a course that extends between the probes, a controller for the feeding means responsive to contact of the strip with the probes to control the operation of the feeder.

6. The apparatus described in claim 5 characterized by the arms being movable into positions that locate the probes close together with a clearance between them somewhat greater than the thickness of the strip for contact with the strip in the event of a buckle in the straightness of the strip, the controller including circuits that are grounded through either of the probes to stop the means for feeding the strip.

7. Apparatus for controlling a motor of feeder mechanism of a machine including an electric control switch, an operating coil for the switch, a power supply circuit to the operating coil, a first circuit responsive to one position of a work piece for opening a circuit to shut off the power supply to the coil, a second circuit responsive to another position of a work piece for closing the circuit to reset the power supply to the operating coil, and a power supply circuit for a motor of the feeder mechanism controlled by said electric control switch.

8. The apparatus described in claim 7 characterized by both of the circuits that are responsive to the position of the work pieces being ground circuits, one of which short circuits the power supply circuit to the operating coil, and the other of which completes a ground connection for the operating coil.

9. The apparatus described in claim 7 characterized by a support along which work pieces are fed, a probe for the first position-responsive circuit at one location along the support in position to respond to passage of a work piece past that location, and another probe of the second position-responsive circuit at another location along the support in position to respond to passage of a work piece past the other location.

10. Control apparatus for automatic machines including a controller having a housing, two studs extending from the outside of the housing, an arm on each of the studs and adjustable angularly about the axes of the studs, probes extending outwardly from the arms at locations spaced from the studs and in directions generally parallel to the axes of the studs whereby angular adjustment of the arms changes the spacing of the probes from one another, an electric circuit in the housing, and conductors leading from different parts of the electric circuit to the respective probes, the studs extending from a side wall of the housing along substantially parallel axes, the side wall being of greater height than width, and the studs being located near opposite extremes of the height of the side wall to obtain increased spacing between them, and the arms being adjustable into positions extending in directions away from one another to space the probes even further apart than the spacing of the studs from one another and at a spacing greater than the height of the side wall of the housing.

11. Apparatus for controlling the feeding of a strip from one unit to another, power means for feeding the strip from one unit to the next, there being a loop of the strip between the units, an upper contact probe located along the loop above the strip, a lower contact probe located along the loop below the strip, control circuits for the power means including a circuit responsive to contact of the strip with the upper probe for starting the feeding of the strip and a circuit responsive to contact of the strip with the lower probe for stopping the feeding of the strip, control means including an electric relay having a bias toward a position that stops the feeding of the strip, a coil that moves the relay into an opposite position to supply power to the strip feed when said coil is energized, a transformer that energizes the relay coil, a self-holding circuit for the relay when the relay is in said opposite position, the transformer being grounded on one side to the strip and on the other side to the upper probe to energize the relay coil, and another ground connection from the lower probe connected with the circuit of the transformer between the transformer and the relay coil to short circuit the coil and de-energize it when the lower probe is grounded on the strip.

References Cited by the Examiner
UNITED STATES PATENTS

| | | | |
|---|---|---|---|
| 1,284,310 | 11/1918 | Gilbert | 141—180 |
| 2,653,536 | 9/1953 | Cooksey | 200—61.18 |
| 2,828,455 | 3/1958 | Kraay et al. | 226—43 |
| 2,866,534 | 12/1958 | Carter | 198—37 |
| 2,920,738 | 1/1960 | Carter | 198—37 |
| 2,951,920 | 9/1960 | Miller | 200—47 |
| 3,107,870 | 10/1963 | Cetnar | 226—43 |
| 3,153,474 | 10/1964 | Wintriss | 198—40 |

ROBERT B. REEVES, *Primary Examiner.*
HADD S. LANE, *Examiner.*